United States Patent
Hegde et al.

(10) Patent No.: US 8,060,855 B2
(45) Date of Patent: Nov. 15, 2011

(54) ARTIFACT SHARING FROM A DEVELOPMENT ENVIRONMENT

(75) Inventors: Rajesh Hegde, Redmond, WA (US); Dragos A. Manolescu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1071 days.

(21) Appl. No.: 11/973,446

(22) Filed: Oct. 9, 2007

(65) Prior Publication Data

US 2009/0094572 A1 Apr. 9, 2009

(51) Int. Cl.
G06F 9/44 (2006.01)
G06F 3/00 (2006.01)

(52) U.S. Cl. ......... 717/103; 717/110; 717/113; 715/751

(58) Field of Classification Search ........................ None
See application file for complete search history.

(56) References Cited

U.S. PATENT DOCUMENTS

| | | | |
|---|---|---|---|
| 6,032,216 A * | 2/2000 | Schmuck et al. | 710/200 |
| 6,662,357 B1 * | 12/2003 | Bowman-Amuah | 717/120 |
| 7,047,279 B1 | 5/2006 | Beams et al. | |
| 7,127,613 B2 * | 10/2006 | Pabla et al. | 713/171 |
| 7,584,453 B2 * | 9/2009 | Bayardo et al. | 717/120 |
| 7,721,110 B2 * | 5/2010 | Kouznetsov et al. | 713/187 |
| 7,756,892 B2 * | 7/2010 | Levy | 707/781 |
| 2004/0100494 A1 | 5/2004 | Ragoler et al. | |
| 2004/0133570 A1 * | 7/2004 | Soltis | 707/3 |
| 2004/0177335 A1 | 9/2004 | Beisiegel et al. | |
| 2005/0091595 A1 * | 4/2005 | Shappell et al. | 715/700 |
| 2005/0114475 A1 | 5/2005 | Chang et al. | |
| 2005/0235011 A1 | 10/2005 | Minium, Jr. et al. | |
| 2006/0041440 A1 | 2/2006 | Cheng et al. | |
| 2006/0080432 A1 | 4/2006 | Spataro et al. | |
| 2006/0095276 A1 | 5/2006 | Axelrod et al. | |
| 2006/0218521 A1 | 9/2006 | Hagstrom et al. | |
| 2008/0140732 A1 * | 6/2008 | Wilson et al. | 707/201 |
| 2008/0201444 A1 * | 8/2008 | Aono | 709/214 |
| 2008/0301299 A1 * | 12/2008 | Cahill et al. | 709/226 |
| 2009/0055809 A1 * | 2/2009 | Campbell | 717/140 |
| 2009/0083268 A1 * | 3/2009 | Coqueret et al. | 707/6 |

OTHER PUBLICATIONS

"Visual Studio .NET Integration Reduces CodeShare Training Costs, Improves Utilization", Date: Mar. 2004, pp. 1-2.

Hupfer, et al., "Introducing Collaboration into an Application Development Environment", Date: Nov. 2004, pp. 21-24, vol. 6, Issue 3.

* cited by examiner

*Primary Examiner* — Tuan Dam
*Assistant Examiner* — Isaac Tecklu
(74) *Attorney, Agent, or Firm* — Ogilvie Law Firm (57) ABSTRACT

An identification of a multi-component development artifact to be shared is obtained in a development environment. A remote receiver with whom to share components of the artifact is designated. Components of the artifact are shared with the remote receiver by automatically locating the components and sending the located components in a package with associated type descriptions. After the package is received, a check for conflicts is made, and acceptable components are merged into the local development environment.

20 Claims, 2 Drawing Sheets

ARTIFACT SHARING FROM A DEVELOPMENT ENVIRONMENT

BACKGROUND

The development of software applications often involves the coordinated efforts of many people (e.g., software developers, testers, and others). While working in teams, individual developers often create or modify artifacts, such as source code, libraries, programming language constructs, configuration files, build files, or even entire projects.

Software development teams often use Integrated Development Environments (IDES) for browsing, writing, debugging, and testing program code. Some IDEs may be considered operating environments for software development artifacts.

SUMMARY

In some embodiments, an identification of a multi-component development artifact to be shared is obtained in a development environment. A remote receiver with whom to share components of the multi-component development artifact is designated. Components of the multi-component development artifact are shared with the remote receiver by automatically locating at least two components of the multi-component development artifact, and sending the located components toward the remote receiver in a package with associated type descriptions. The package is received in a development environment, and a user may be alerted to the presence of the received components. A check for conflicts may be made. The received components may be merged into the local development environment. Some embodiments provide one-click artifact sharing in a collaborative environment.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean the content of a Figure is not being discussed by the text. The inventors assert and exercise their right to their own lexicography. Terms may be defined, either explicitly or implicitly, here in the Detailed Description and/ or elsewhere in the application file.

As used herein, an "artifact" is a collection of one or more physical components which is available and manageable within a development environment, and which can be transmitted across a network. Some examples of software artifacts are a line of program code; a function, a method, or a subroutine; a class; a namespace; an entire file; an entire project; multiple projects; and an entire solution in Visual Studio® or another platform, which may contain multiple projects.

"Physical components" are sometime referred to herein simply as "components". Some examples of physical components are a file; a directory of files; a database record; a database; a webpage; a website; a library; a data stream; and an XML record.

A "development environment" is a computer-implemented environment which supports development by providing tools to help create, track, and modify items.

An Integrated Development Environment (IDE) is a development environment that provides tools to create and modify software, e.g., editors and compilers/interpreters. IDEs available today to assist developers include, for example, the Microsoft) Visual Studio® environment (marks of Microsoft Corporation), the Anjuta IDE, the Eclipse open development platform (mark of Eclipse Foundation, Inc.), and others.

As used herein, a "computer system" may include, for example, one or more personal computers (portable or not), servers, personal digital assistants, cell or mobile phones, and/or device(s) having a processor controlled at least in part by instructions. The instructions may be in the form of software in memory and/or specialized circuitry. In particular, although it may occur that many embodiments run on personal computers, other embodiments may run on other computing devices, and any one or more such devices may be part of a given embodiment.

Operating Environment

Figure 1:
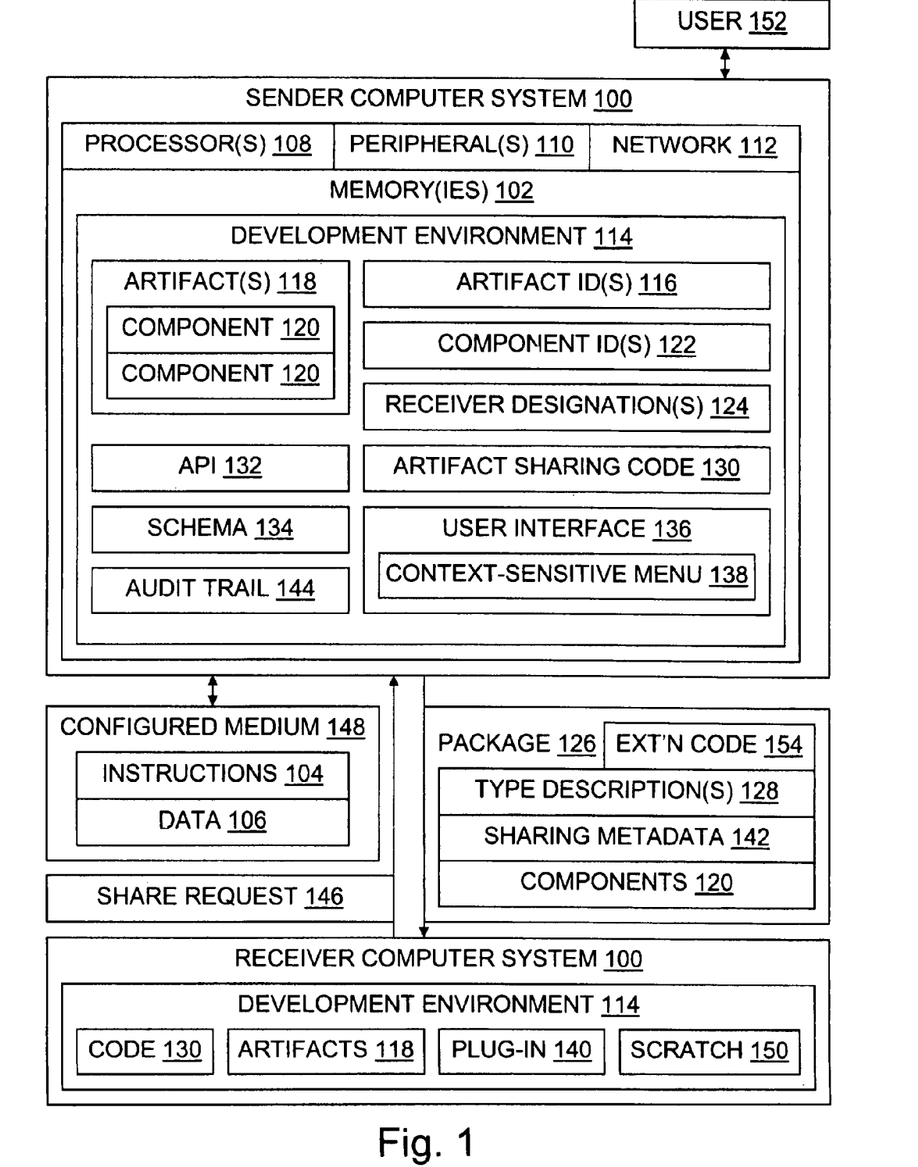
FIG. 1 is a block diagram illustrating an operating environment, some data structures and their uses, and some system and configured storage medium embodiments.

With reference to FIG. 1, an operating environment for an embodiment may include, for instance, a sender computer system 100 and a receiver computer system 100. The sender and receiver computer systems are each shown as a computer system 100 in FIG. 1, rather than being assigned different reference numerals, but the sender and receiver computer systems 100 need not be identical. As discussed herein it may occur that the sender and receiver systems are configured differently from one another in various respects. In particular, the sender computer system may include native support for artifacts which are not natively supported on the receiver computer system.

A development environment 114 configures the memory of the sender computer system 100, and another development environment 114 configures the memory of the receiver computer system 100. Like other code, including artifact sharing code 130 discussed herein, the code that provides the development environment 114 includes instructions 104 that are executable by the processor 108, and also includes data 106 (possibly including data structures) which is created, modified, referenced, and/or otherwise used by the instructions 104. The instructions 104 and the data 106 configure the memory 102 in which they reside; when that memory is a functional part of a given computer system 100, the instructions 104 and data 106 also configure that computer system 100.

As noted, different computer systems 100 may have different configurations. In particular, it will often occur that the two development environments 114 differ from one another in some respects. For example, one development environment often has particular artifacts 118 that are not present, at least in the same version, in the other development environment.

An operating environment for an embodiment may include a single computer system 100. An embodiment may also include two or more computer systems 100, which may be linked to one another for networked communication. A development environment 114 is also part of the operating environment; some operating environments include multiple development environments 114.

The development environment 114 may be any development environment compatible with the embodiments discussed herein. One or more of the development environments 114 in a given configuration may be integrated development environments. One suitable integrated development environment is the Microsoft) Visual Studio® IDE (marks of Microsoft Corporation), but embodiments are not limited to the Visual Studio® IDE.

The computer system 100 may run any operating system, and may use any network interface equipment 112, now known or hereafter formed. The operating environment may include computer systems 100 that are client-server networked and/or peer-to-peer networked. Some operating environments include a stand-alone (non-networked) computer system 100. Artifacts may be sent from one computer system toward another computer system for sharing by copying the artifacts onto a removable medium such as a flash memory or a DVD, instead of or in addition to sending artifacts by transmission over a network. Sharing may be synchronous and/or asynchronous.

Systems

Some embodiments include a sender computer system 100 configured for sharing development artifact components with a receiver computer system 100. Each computer system 100 includes a memory 102 configured with computer-executable instructions 104 and data 106. Each computer system 100 also includes a processor 108, coupled with the memory 102, to execute the instructions 104 for performing steps discussed herein.

In some embodiments, peripheral equipment 110 such as human user I/O devices (screen, keyboard, mouse, microphone, speaker, motion sensor, etc.) will be present in operable communication with the processor 108 and the memory 102. However, an embodiment may also be deeply embedded in a larger system, in a configuration having no human user 152 interact directly with the embodiment.

In some embodiments, networking interface equipment 112 such as a packet-switched network interface card, a wireless transceiver, or a telephone network interface, for example, will be present in the computer system 100. However, an embodiment may also communicate through direct memory access, removable nonvolatile media, or other information storage-retrieval and/or transmission approaches.

Some embodiments include one or more development environments 114. In some embodiments, the development environment 114 is an integrated development environment. In some embodiments, the development environment includes an integrated development environment 114.

Some embodiments obtain in the development environment an identification 116 of a multi-component development artifact 118 to be shared. The artifact identification 116 may include, for example, a name, a file path, a stream ID, a handle, a GUID, a pointer, a hyperlink, or another form of address.

A multi-component development artifact is an artifact which is part of a development effort (past or present), and which has at least two physical components 120. As an example, a memo artifact could have a binary digital sound file component 120 and a corresponding XML metadata file component 120, with the metadata indicating the date the sound file was recorded, the sound file's creator, and some subject matter keywords.

A component 120 may be identified by a component identification 122, such as a name, a file path, a handle, a GUID, a pointer, a hyperlink, or another form of address.

Some embodiments determine in the development environment a designation 124 of a remote receiver with whom to share components 120 of the multi-component development artifact 118. In FIG. 1 the remote receiver is shown as receiver computer system 100, but the receiver, like the sender, may be a human user 152, or a specific process running on a computer or on a group of computers, or a computer system. The designation 124 may include, for example, a name, an email address, an IP or other network address, a process ID, a port ID, an identity certificate, or another designation of an entity to receive an artifact.

In some embodiments, components 120 of the multi-component development artifact 118 are shared without further user interaction, after the artifact identification is obtained and the receiver designation is determined. For example, by reducing user interaction an embodiment may allow a user 152 to avoid the tedium of cutting and pasting source code into an instant message. Reducing user interaction may similarly prevent the interruption of exiting an IDE, browsing a file system to find several pertinent files, attaching them to an email message, and sending the email. Some embodiments automatically locate at least two components 120 of the multi-component development artifact 118, and then send the located components 120 toward the remote receiver in a package 126 with associated type descriptions 128, without forcing a break in the sender's concentration on the development task at hand.

Some embodiments automatically locate protected (encrypted and/or digitally signed) components 120, and send the located protected components 120 toward the remote receiver. A protected component may be located by locating a previously encrypted/signed component and/or by newly encrypting and/or signing a located component.

A type description 128 may be in XML format, database record format, or another form. Information in a type description 128 for a given component 120 may include, for example, file types, e.g., file extensions; version control information such as creator and dates of creation and last modification; flags indicating known (in)compatibilties with other components; and lists of known hardware and software (in)compatibilties with respect to the component 120 in question.

In some embodiments, receiving code 130 in the receiver computer system 100 is provided. At one or more remote receiver locations, additional processor(s) coupled with additional memory(ies) ("additional" here meaning outside the sender computer system) execute code 130 instructions for receiving a package 126 of components 120 being shared. In a given embodiment, receiving code 130 may be capable of checking for conflicts between received components 120 and components already present in the receiver computer system 100 before receipt of the components being shared and/or capable of merging received components 120 into the receiver computer system 100's local development environment 114, for example. In some embodiments, a system is configured to automatically determine whether a conflict between components may occur, by comparing information from a type description in a package with information about a component that was already present in an integrated development environment before a package receiving step occurs.

In some embodiments, the receiver system 100 is configured to place the received components 120 in a scratch buffer 150 without merging the received components 120 into the local development environment, e.g., without merging the received components into an integrated development environment on a receiver computer system 100. Thus, local versions of components are not necessarily overwritten by versions received from a collaborator.

In some embodiments, the sender computer system 100 and the receiver computer system 100 each contain the same sending code 130 for sharing artifacts and the same receiving code 130 for managing received artifacts. In other embodiments, the code 130 on the sender differs from the code 130 on the receiver. For example, the types of artifacts recognized by the respective codes 130 may differ.

In some embodiments, the memory 102 is configured with an application program interface 132 designed to extend artifact sharing capabilities to artifacts 118 that are not native to a given development environment 114. An integrated development environment may be extended to support new component types by including such an application program interface 132. The application program interface may be published, to provide an infrastructure for extending artifact sharing capabilities of development environments, whether the artifacts are proprietary, newly created, or already in use at different locations.

In some embodiments, the memory 102 is configured with an automatically parsable schema 134 which describes at least one relationship between physical components 120 and a multi-component development artifact 118. For example, the schema 134 could indicate that a memo artifact 118 has as its components 120 a binary digital sound file component 120 and an XML metadata file component 120. A multi-component artifact 118 may also be called a "logical artifact" in recognition of one or more logical relationships between the artifact as a whole and its various components.

In some embodiments, the memory 102 is configured with, and the processor 108 executes, instructions 104 for a user interface 136 of the development environment 114. In some embodiments, the user interface 136 has a context-sensitive menu 138 which the code 130 uses to elicit artifact identifications 116, component identifications 122, and/or receiver designations 124 from a user 152. For example, the user interface 136 may elicit from a user an express identification of an artifact 118, an express identification of one or more components 120 of an artifact, and/or an express designation of one or more remote receivers.

In some embodiments, the sender computer system 100 prepares and sends a self-installing plug-in package 126. A self-installing plug-in package 126 includes extraction code 154 of the type used, for example, in self-extracting archive files. A self-installing plug-in package may include a custom designer and/or plug-in 140 code which provides functions providing native support for the artifact components. Native support functionality could include, for example, code and/or schema 134 updates which: relate component types to a given artifact type, store and retrieve components to provide a consistent and interoperable set of components, display components having audiovisual content, modify component content, and so on.

In some embodiments, the sender computer system 100 prepares and sends a package 126 which contains sharing metadata 142. Sharing metadata may be used to assist with identification of reusable artifacts. For example, if developers keep sharing a particular artifact, that artifact may be a good candidate for incorporation into a software library. Sharing metadata may be in the form of an XML record, for example, or some other data structure. Sharing metadata 142 may include historic information about the sharing of the packaged artifact 118, such as who else the artifact 118 has been shared with, when the sharing occurred, what version of the artifact 118 was shared in each instance, and the like. Metadata may also indicate whether a given receiver has previously shared any artifacts with a given sender, and if so, what was shared, which version, when the sharing occurred, and so on.

In some embodiments, the sender computer system 100 and/or the receiver computer system 100 maintains an audit trail 144. The audit trail may identify, for example, an artifact 118, a sender, a receiver, dates and times a package 126 was sent, addressing information and/or routing used to send the package 126, and details as to how the package 126 containing the artifact components 120 was protected, e.g., by encryption, digital signature, and the like. The audit trail 144 may itself be secured by a digital signature and/or access controls, for example.

In some embodiments, the receiver sends the sender a share request 146. In response to the share request 146 received by the sender, the package 126 is built and sent toward the receiver. The share request 146 may include, for example, a designation 124 of the prospective receiver who is making the request 146, an identification 116 of the artifact 118 sought and/or an identification 122 of the component 120 sought, and an indication as to whether the receiver computer system 100 has in place native support for the desired component 120.

Share requests may be sent in either or both directions and/or broadcast, depending on a given embodiment's configuration and capabilities. In some embodiments a prospective sender sends a share request to a prospective receiver, offering to share an artifact. The share request may include a preview of the artifact, e.g., an image thumbnail or a snippet of text to be displayed.

Share requests may also serve an authentication role, e.g., by indicating that an artifact contains confidential information requiring a password for access.

In one scenario, a prospective sender sends a prospective receiver an offer to share an artifact. The prospective receiver replies, asking for the artifact. Such replies may be sent automatically, based on the identity of the prospective sender and/or based on the identity or type of the artifact, for example. The reply may also list potential conflicts, based on artifact information provided in the sender's share request.

Some embodiments include a configured computer-readable storage medium 148. In a computer system 100, disks (magnetic, optical, or otherwise), RAM, EEPROMS or other ROMs, and/or other configured storage medium 148 can be provided as part of working memory 102, and/or in addition to working memory 102. A general-purpose storage medium, which may be removable or not, and may be volatile or not, is configured with data structures and data 106 and instructions 104 to thereby form a configured medium 148 which is capable of causing a device or other system 100 with a processor 108 to perform steps and provide functionality disclosed herein. Such data 106 and instructions 104 may be part of or include development environment 114 code, artifact sharing code 130, user interface 136 code, a schema 134, plug-ins 140, and/or other code (instructions and data) discussed herein to provide artifact sharing capability. FIG. 1 thus helps illustrate configured storage media embodiments, as well as system embodiments, process product embodiments, and method embodiments. A configured medium may also be considered a process product, produced using for example steps shown in FIG. 2.

Not every item shown in FIG. 1 need be present in every system embodiment or in every configured medium embodiment. Although implementation possibilities are illustrated here in text and drawings by specific examples, other embodiments may depart from these examples. For instance, specific features of an example may be omitted, renamed, grouped differently, repeated, instantiated in hardware and/or software differently, or be a mix of features appearing in two or more of the examples.

Methods

Figure 2:
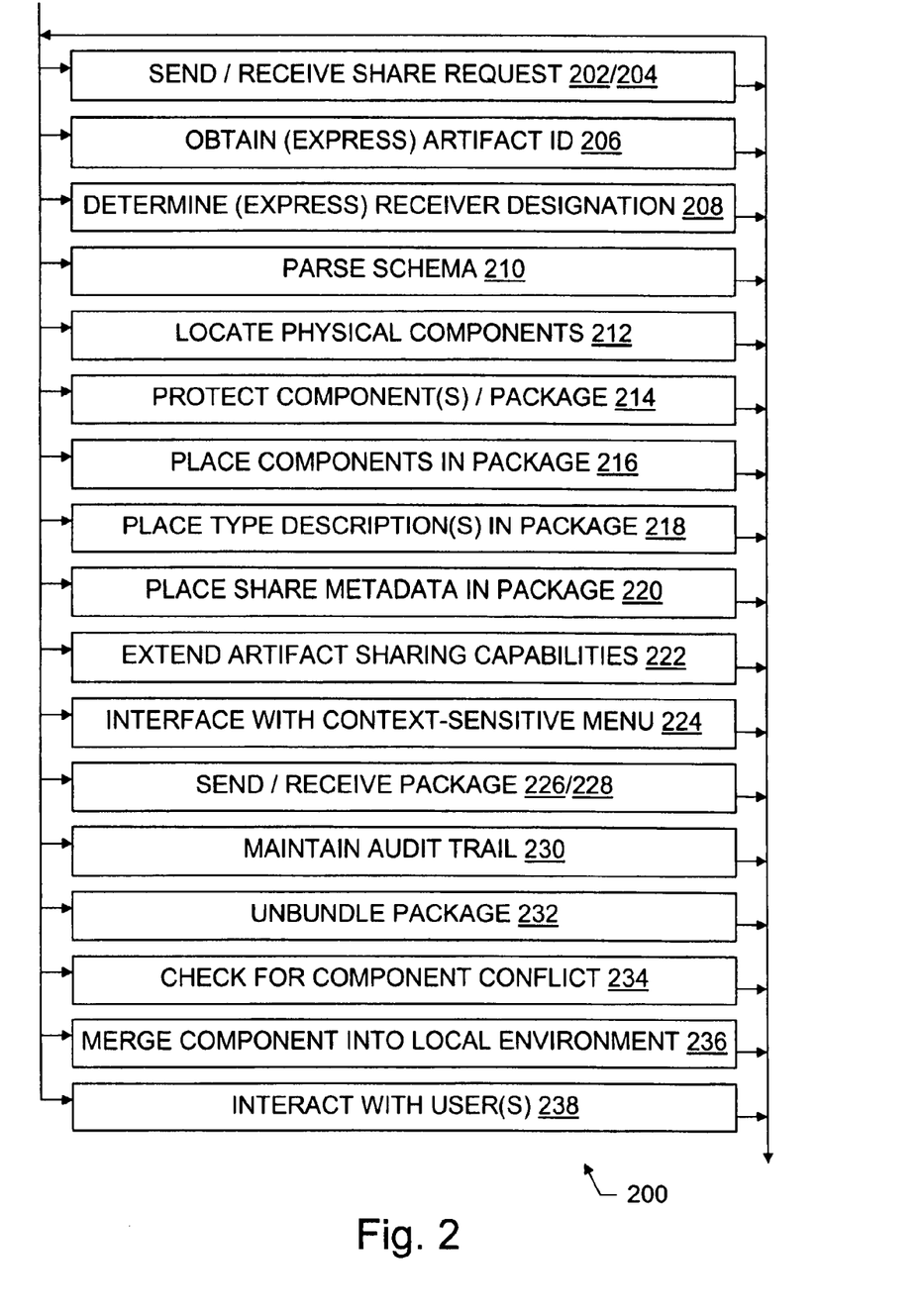
FIG. 2 is a flow chart illustrating steps of some method and configured storage medium embodiments.

FIG. 2 illustrates some method embodiments in a flowchart 200. However, in a given embodiment zero or more illustrated steps of a method may be repeated, perhaps with different parameters or data to operate on. Steps in an embodiment may also be done in a different order than the top-to-bottom order that is laid out in the Figure. Steps may also be omitted, combined, or otherwise depart from the illustrated flow, provided that the method performed is operable and conforms with at least one claim.

During a share request sending step 202, a prospective artifact receiver sends a share request to a prospective sender, asking that the prospective sender share a specified artifact with the prospective receiver. The share request may be a share request 146, for example. The share request may be sent over a network link and/or another communication path.

During a corresponding share request receiving step 204, the prospective sender receives the share request. In some embodiments, however, share requests travel from a prospective sender to a prospective receiver, as discussed elsewhere herein.

During an artifact identification obtaining step 206, an embodiment obtains an artifact identification, e.g., an artifact identification 116. In some cases, a user expressly identifies to the embodiment the artifact to be shared, e.g., by menu 138 item selection. In some cases, the artifact identification is not obtained by express user action but is instead inferred, e.g., the most recently accessed (e.g., viewed, created, or modified) artifact is identified.

In some embodiments, a collaborator who is initiating a share request does not need to specify expressly which items to share. An integrated development environment maps a logical artifact that the collaborator wants to share into physical elements associated with that logical artifact. The burden of selecting all the required physical elements is thus placed on the integrated development environment and/or on other sharing system mechanisms, rather than being placed on the user.

During a receiver designation determining step 208, an embodiment determines a receiver designation, e.g., a receiver designation 124. In some cases, a user expressly designates to the embodiment the remote receiver with whom to share components, e.g., by menu 138 item selection. In some cases, the remote receiver designation is not determined by express user action but is instead inferred, e.g., the receiver most recently contacted by email or by instant messaging is designated.

During a schema parsing step 210, an embodiment parses a schema, e.g., a schema 134, in order to identify physical components that belong to an identified artifact. In some embodiments, metadata describing an identified artifact may also be identified in the schema, e.g., sharing metadata 142. Parsing may be performed using familiar techniques adapted for use with schemas that relate artifacts with their physical components.

During a component locating step 212, components belonging to an artifact are located. In some embodiments, the locating step 212 includes parsing 210 a schema 134 to identify physical components 120 of a multi-component software development artifact 118. Artifact components are also referred to herein as "physical components", in recognition of their presence in physical storage such as a memory 102 and/or a removable medium 148. Locating step 212 provides artifact sharing code with access to the digital information contained in an artifact's components. Information stored in the located components can then be sent to a receiver after being encrypted/signed, packaged, logged in the audit trail, and so on, depending on the specific situation.

During a protecting step 214, a copy of artifact components is encrypted and/or digitally signed to protect its confidentiality and/or its integrity. Components may be individually encrypted and/or individually signed before being placed in a package such as a package 126. The package may be encrypted and/or signed in a particular embodiment, regardless of whether individual components within the package were also previously encrypted and/or signed.

During a component placing step 216, components of an artifact are placed in a package, such as a package 126. Placing a component may be done by copying content of the component into a memory buffer in which the package is being built. Component placing step 216 may also involve updating a package header or other data structure which lists the components and other contents of the package, e.g., metadata A package's header may also list relative positions of contents within the package. In some embodiments, all components of a given artifact are placed in a package that is being used to share at least one component of the artifact. In other embodiments, some components of a shared artifact may be omitted from a package, e.g., if a preceding share request listed certain large components as being already present and current on a receiver computer system.

During a type description placing step 218, type descriptions such as type descriptions 128 are placed in a package such as a package 126. Placing a type description may be done by copying the type description from a schema such as a schema 134 into a memory buffer in which the package is being built. If a type description cannot be read from a schema, then a type description of the component in question may be inferred from a component using file name conventions, from header data at the front of a component file, from the directory in which a component file is stored, and/or from recent uses of the component within a development environment, e.g., text recently submitted to a compiler is likely of a source code type, for example. Inferred type descriptions may be placed in a package by writing their identifying values into a memory buffer in which the package is being built.

During a sharing metadata placing step 220, metadata such as sharing metadata 142 is placed in a package such as a package 126. Placing sharing metadata may be done by copying the sharing metadata from a schema such as a schema 134 and/or from an audit trail such as audit trail 144 into a memory buffer in which the package is being built. If a package will contain components that have not previously been shared, then sharing metadata may be generated during metadata placing step 220.

During a capability extending step 222, artifact sharing capabilities of an artifact are extended by adding code to artifact sharing code that is already present, and/or by adding schema data to define relationships between components and artifacts. In particular, artifact sharing code may be extended in some embodiments by installing a plug-in such as plug-in 140 which is designed to recognize and support use of specific artifacts.

For instance, a plug-in could be used to extend artifact sharing functionality of an integrated development environment by providing native support for a memo artifact which is defined in a schema to have a binary digital sound file component and an XML record component, with the XML record component containing a recording date and other searchable data. The memo artifact plug-in would store the sound file and the XML file in correspondence with one another, e.g., in the same directory. The memo artifact plug-in could also provide comparison functions to show whether two memo artifacts have the same content, and perhaps to display any differences between the two memo artifacts.

In some embodiments, a plug-in is itself a shareable artifact.

During an interfacing step 224, a user and a development environment interface with one another by way of a context-sensitive menu, such as a context-sensitive menu 138. For example, a menu may list an artifact most recently accessed by a first user and offer the first user a menu item whose selection causes the development environment to share the artifact with a second user. Similarly, a menu may list a second user most recently in communication with the first user and offer the first user a menu item whose selection causes the development environment to send a share request to the second user.

An integrated development environment may have a view where one can see files, classes and other shareable artifacts. To facilitate sharing, an embodiment may add extend a context menu with a "share artifact with" option. When the "share artifact with" option is selected the development environment identifies a shareable artifact in a manner that reflects user intent; this may be termed "polymorphic sharing". For example, a sharing operation could be invoked while a code fragment is highlighted, from a method, from a class, from a file, and so on.

As a particular example, an embodiment which includes Microsoft® Visual Studio® might present a code sharing menu item in a Solution View containing the following items: Open, Open With . . . , View Code, View Class Diagram, Exclude From Project, Share With . . . , Cut, Copy, Delete, Rename, Properties. If the "Share With" option is selected then an entire solution (with all files of the solution) would be shared. An embodiment might present a code sharing menu item in a Class View containing the following items: View Class Diagram, Share With . . . , Go To Definition, Browse Definition, Find All References, Filter To Type, Invoke Static Method, Copy, Rename . . . , Sort Alphabetically, Sort By Object Type, Sort By Object Access, Group By Object Type. If the "Share With" option is selected then a unit of sharing, e.g., a class, can be determined from context. When a user right-clicks in a Code Editor, an embodiment might present a menu containing the following items: Refactor, Create Unit Tests, Share With . . . , Insert Snippet . . . , Surround With . . . , Go To Definition, Find All References, Breakpoint, Run To Cursor, (grayed) Go To Disassembly, Cut, Copy, (grayed) Paste, Outlining. If the "Share With" option is selected then a unit of sharing, e.g., a method, can be determined from context.

Similarly, sharing menu items can be added to a main menu and/or in other appropriate places. When a user clicks on a sharing menu item, a dialog could prompt the user for a designation of a party with whom code will be shared. The designation could be pre-populated based on project membership or by using a buddy list from an existing instant messaging tool on the user's machine. Once the user selects a co-developer to share an artifact with, the artifact gets packaged, encrypted for security, sent over a communication channel and delivered to the recipient. Delivery may be immediate in some situations, whereas in other situations, such as when working offline or when a remote party is busy, a sharing request could be queued and performed at a later time. On receiving a shared artifact package, an integrated development environment could position a cursor indicating where the shared artifact will be added, allowing a receiving user to either accept the suggestion (and then performing an intelligent merge), or allowing a receiving user to add the artifact manually to the local development environment.

Other examples of context-sensitive menus suitable for use in a given embodiment will also be apparent to one of skill.

During a package sending step 226, an artifact sender sends a package, such as a package 126, toward a receiver to share specified artifact components, such as components 120, with the receiver. The package may be sent over a network link and/or another communication path. In some cases, there is one sender and one receiver, while in other cases there is one sender but multiple copies of the package are sent toward respective multiple receivers.

In some cases, a single human user serves both as a sender and as a receiver for a given package. For instance, a developer may send a package containing a project artifact from a workstation computer system used by the developer to a laptop computer system used by the developer.

In some cases, a sender and/or a receiver is an automatic process rather than a human. For example, automatic user processes may be part of a configuration for performing a system build or using an integration server, for performing archival or other backup, for controlling versions in a source code control system, and for internationalizing or otherwise customizing a particular instance of a program.

In some embodiments, the package sending step 226 sends a copy of located components toward the remote receiver in a self-installing plug-in package, such as a self-installing plug-in package 126 discussed above, for installing a plug-in 140 at a receiver computer system 100.

During a package receiving step 228, a receiver receives a package that was previously sent. In some cases, one receiver receives multiple related packages from respective multiple senders. For example, a team leader may receive two proposed solutions to a coding problem with each solution involving changes to a particular code component. Similarly, a team leader may receive related components from different developers during a project build before a product is released to manufacturing.

In some embodiments, a system is configured to receive components of different file types and also of different categories which are part of one multi-component software development artifact. Some examples of component categories include: program code, whether source or executable; natural language text; images; and sound recordings.

During an audit trail maintaining step 230, package sending activity, package receiving activity, share request transmissions, and/or other activities are logged into a secured audit trail, such as an audit trail 144.

During a package unbundling step 232, a received package such as a package 126 is unbundled at a receiver location. Unbundling may involve verifying a digital signature, decrypting a package and/or decrypting individual components of a package, and entering into an alert queue an identifier such as an artifact identifier 116 and/or a component identifier 122, to identify contents of a package.

During a component conflict checking step 234, an embodiment checks received components against components already present at the receiver's location, in order to identify possible and/or actual conflicts between the various components. Tools and techniques such as code graph analysis, dependency analysis, revision history review, executable versioning, plug-in compatibility testing, differencing, digital signatures, and source code control may be adapted for conflict checking in a given embodiment. The conflict checking performed may depend on the type of component; techniques suitable for source code components may not be suitable for image components, and vice versa, for example. A search may be made for the same component and/or related components in a receiver computer system, by adapting integrated development environment artifact and metadata management functionality, including in particular library management functionality.

During a component merging step 236, an embodiment merges received components into artifacts already present at the receiver's location and/or adds new artifacts to a receiver's development environment. In some embodiments, a merge can be undone, using a history and/or snapshot technique adapted for use from existing technology. In some cases, an embodiment may receive an artifact without also merging the artifact. For instance, an artifact may be refused outright, or an artifact may be placed in a scratch buffer 150 apart from a development environment's library of active artifacts. In some cases, a new parallel version of a project is created, one with a recently received artifact merged in and one without.

During an interacting step 238, an embodiment interacts with a user at a receiver location. For example, sharing code implementing an embodiment at a receiver location may alert a human user to the presence of conflicts and/or potential conflicts after checking 234 for conflicts, and invite a response from the user indicating which version of a component to keep in a local collection of artifact components. Some other examples of interacting 238 include obtaining 206 express artifact identifications, determining 208 express receiver designations, and displaying information about artifacts such as information found in sharing metadata or in an audit trail.

Some embodiments include a method for sharing software development artifact components, including obtaining 206 in an integrated development environment 114 an identification 116 of a multi-component software development artifact 118 to be shared; determining 208 in the integrated development environment a designation 124 of a remote receiver with whom to share components 120 of the multi-component software development artifact; and then without further user interaction sharing components of the multi-component software development artifact with the remote receiver by automatically: locating 212 at least two components of the multi-component software development artifact, and sending 226 a copy of the located components toward the remote receiver in a package 126 with an associated type description 128 of the multi-component software development artifact. Some embodiments send a package which contains sharing metadata, namely, historic information about the sharing of the artifact. Some embodiments maintain an audit trail identifying at least the artifact and the remote receiver.

ADDITIONAL EXAMPLES

Some embodiments use or provide an algorithm for fast in-place artifact sharing. The algorithm does not necessarily include any particular user experience associated with an insert/merge step, or any particular manner (e.g., visual cues, bells, emails, and so on) of alerting a user to algorithm completion.

At a sender's end, the algorithm proceeds as follows:
Determine a shareable artifact's type.
Find a schema that prescribes physical elements of the artifact, namely, what information should be sent to a receiver's end.
Use the schema to extract from memory and/or development environment code all the physical elements corresponding to the shareable artifact.
Package all the physical elements together in a package, including a type description and relative locations of items within the package.
Sign and encrypt the package.
Send the package toward the receiver.
At the receiver's end the algorithm proceeds as follows:
Decrypt the package and verify its signature.
For each physical element, first determine whether there is a conflict with any local artifacts and if necessary employ a conflict resolution/merge. The conflict resolution/merge operation depends on the artifact type and could be manual, partially automatic, or fully automatic. Then, insert/merge the physical element into the local development environment (e.g., editors, file system, etc.).
Finally, add an entry to a queue containing received artifacts. If the type of the artifact is known then convert the physical elements into a single queue item that may be expanded on demand by a user.

One end to end scenario for artifact sharing includes the following. In the scenario, a receiving end supports a particular shareable artifact.

Preconditions in the scenario include the following. Developers A and B are engaged in collaborative software construction, using a development environment similar to Microsoft® Visual Studio®. Both developers extended their development environments with a custom designer. Consequently, when opening an artifact file with a specific extension (like .btm) the development environment fires off the custom designer rather than a generic editor employed for unrecognized file types. A's development environment holds an artifact that doesn't exist in B's development environment.

A stimulus to sharing occurs in the scenario when developer A selects an artifact to be shared and invokes an in-place artifact sharing functionality.

Flow in the scenario occurs as follows. At the sending end (A) the development environment uses the type of the shared artifact to determine what should be packaged for the receiver, according to information provided by the custom designer. A's development environment sends a sharing request to B's environment. At the receiving end (B) the development environment prompts B for a decision on whether to accept or reject the shared artifact; B accepts the shared artifact. A's environment sends files associated with the shared artifact to B's environment after packaging and encrypting the files. B's environment checks for potential conflicts and finds none. B's environment places the files in appropriate folders and updates a queue that provides quick links to shared artifacts. Because the custom designer required for working with the shared artifact is available the queue shows the shared artifact as a single item. B clicks on the artifact just received from A and thereby opens the custom designer associated with the artifact.

Postconditions in the scenario include the following. The shareable artifact exists in A's development environment and also in B's development environment. B's development environment lists the shareable artifact, displayed as a single item, as the most recent addition.

Another end to end scenario for artifact sharing includes the following. In the scenario, a receiving end does not support a given shareable artifact.

Preconditions in the scenario include the following. Developers A and B are engaged in collaborative software construction, using a development environment similar to Microsoft® Visual Studio®. Only developer A has extended a development environment with a custom designer; B has not. B's development environment doesn't have the custom designer, and thus when opening a file the development environment fires off a generic editor employed for all unrecognized file types. A's development environment holds an artifact that doesn't exist in B's development environment.

A stimulus to sharing occurs in the scenario when developer A selects an artifact to be shared and invokes an in-place artifact sharing functionality.

Flow in the scenario occurs as follows. At a sending end (A) the development environment uses the type of the shared artifact to determine what should be packaged for a receiver, with information provided by the custom designer. A's development environment sends a sharing request to B's environment. At a receiving end (B) the development environment prompts the user B for input on whether to accept or reject the shared artifact, and warns B that the shared artifact is suitable for a custom designer that is unavailable in the development environment. B accepts the shared artifact. A's environment sends the files associated with the shared artifact to B's environment, after packaging and encrypting the files. B's environment checks for potential conflicts and finds none. B's environment places the files in appropriate folders and updates a queue that provides quick links to shared artifacts. Because the custom designer is unavailable the queue shows all the files associated with the shared artifact instead of displaying a single item. B clicks on one of the files corresponding to the artifact just received from A. The file has an unregistered extension and thus the development environment opens the generic editor.

Postconditions in the scenario include the following. The shareable artifact exists in both A's development environment and B's development environment. B's development environment lists all the files associated with shareable artifact as the most recent additions.

Some embodiments conform with a particular high level architecture for sharing code artifacts. In the architecture, a sender includes a Code Piece Selector module, a Packager and Encryptor module, and a Communication Channel module. A receiver includes a Communication Channel module, an UnPackager and Decryptor module, a Code Piece Renderer module, and an AutoMerger/Simple Copier module. When sharing an artifact from the sender to the receiver, data and control flow through these modules in the order stated. The Code Piece Selector module, the Code Piece Renderer module, and the AutoMerger/Simple Copier module are artifact-specific, and hence change depending on the shareable artifact's type.

The architecture modules can be mapped to items shown in the Figures in various ways. One mapping is as follows: Code Piece Selector module (130, 136, 138, 206, 208), Packager and Encryptor module (130, 210, 212, 214, 216, 218, 220), sender Communication Channel module (112, 130, 226), receiver Communication Channel module (112, 130, 228), UnPackager and Decryptor module (130, 232), Code Piece Renderer module (130, 234), AutoMerger/Simple Copier module (130, 236, 238). Other mappings may also be made. For example, audit trail 144 and maintaining 230 an audit trail could be mapped to any one or more of the modules. Interacting 238 with users could be mapped to any one or more of the modules. Share request 146, 202, 204 items could be mapped to any one or more of the modules. Other mappings will also be apparent to one of skill.

Other protocols, tools, and techniques may also be combined with items shown in the Figures. For example, an embodiment may build on a protocol of an underlying collaborative platform, such as a run-time error checking protocol, a common language runtime environment, or the like.

CONCLUSION

Software development teams use integrated development environments such as Microsoft® Visual Studio® for browsing, writing, debugging and testing code. When working in teams, individual developers often help team members by sharing artifacts, such as source code, programming language constructs (e.g., functions, methods, classes, etc.), configuration files, build files, or even entire projects. Traditionally such code sharing has been accomplished by one or more of the following approaches: use an instant messaging tool and send the code as text message; copy the code to a shared folder and inform the other team members about the location using instant messaging or email; attach the code file to an email and send the email to the co-developer; check the code into a source control system and ask the co-developer to check the code out of the source control system; upload the code to a website and inform the co-developer that the code can be downloaded from the website.

While such approaches may be used, they have not been conceived and designed for sharing integrated development environments artifacts. Consequently such approaches have several problems when used for code sharing: placing burdens on users; sharing of code through instant messaging applications is suitable for only small snippets of code because the amount of text one can post in an instant messaging chat window is limited; traditional approaches involve multiple context switches at the sending end—moving away from what the developer is working on to a different application such as instant messaging, email, and web browser applications, to perform multiple tasks to share code with the co-developer; traditional approaches also involve multiple context switches and tasks on the receiving end; a receiving party has to merge the code they received into their own code, which is error prone; traditional approaches treat a shared code artifact as merely a piece of text, thereby losing structure and formatting associated with the code; some instant messaging clients do not use an encrypted protocol, and sharing artifacts over an insecure channel has security implications. By contrast, with some embodiments sharing can be a single-click operation with little or no burden placed on users.

Some embodiments reduce or solve the foregoing problems by introducing artifact sharing semantics into a development environment. Embodiments may also attach meaning to what is shared by retaining artifact structure and format. Some embodiments provide one-click artifact sharing in a collaborative environment.

Although particular embodiments are expressly illustrated and described herein as methods or systems, it will be appreciated that discussion of one type of embodiment also generally extends to other embodiment types. For instance, the descriptions of methods in connection with FIG. 2 also help describe systems like those described in connection with FIG. 1, and vice versa. It does not follow that limitations from one embodiment are necessarily read into another.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification. Repeated claim language may be inserted outside the claims as needed.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer system configured for sharing development artifact components, comprising:
    a memory configured with computer-executable instructions;
    a processor, coupled with the memory, that executes the instructions for:
        obtaining in a development environment an identification of a multi-component development artifact to be shared;
        determining in the development environment a designation of a remote receiver with whom to share components of the multi-component development artifact;
        and then without further user interaction sharing components of the multi-component development artifact with the remote receiver by automatically locating at least two components of the multi-component development artifact, and sending the located components toward the remote receiver in a package with associated type descriptions.

2. The system of claim 1, wherein the system automatically locates at least two protected components of the multi-component development artifact, and sends the located protected components toward the remote receiver in the package with associated type descriptions, wherein a protected component is a component which has been encrypted and/or digitally signed.

3. The system of claim 1, wherein the memory is further configured with an application program interface designed to extend artifact sharing capabilities to artifacts that are not native to the development environment.

4. The system of claim 1, wherein the memory is configured with an automatically parsable schema which describes at least one relationship between physical components and the multi-component development artifact.

5. The system of claim 1, wherein the memory is further configured with, and the processor executes, instructions for a user interface of the development environment, the user interface having a context-sensitive menu to elicit from a user at least one of the following: an express identification of at least one component of the multi-component development artifact, an express designation of multiple remote receivers.

6. The system of claim 1, further comprising, at a remote receiver location, another processor coupled with another memory that executes instructions for receiving the package of components being shared.

7. The system of claim 6, wherein the memory at the remote receiver location is configured with, and the processor coupled with that memory executes, instructions for checking for a conflict between the components being shared and a component that was present at the remote receiver location before receipt of the components being shared.

8. The system of claim 6, wherein the memory at the remote receiver location is configured with, and the processor coupled with that memory executes, instructions for merging into a local development environment the components being shared.

9. A method for sharing software development artifact components, comprising:
    obtaining in an integrated development environment an identification of a multi-component software development artifact to be shared;
    determining in the integrated development environment a designation of a remote receiver with whom to share components of the multi-component software development artifact;
    and then without further user interaction sharing components of the multi-component software development artifact with the remote receiver by automatically:
        locating at least two components of the multi-component software development artifact, and
        sending a copy of the located components toward the remote receiver in a package with an associated type description of the multi-component software development artifact.

10. The method of claim 9, wherein the locating step includes parsing a schema to identify physical components of the multi-component software development artifact.

11. The method of claim 9, wherein the obtaining step receives from a user an express identification of at least one component of the multi-component software development artifact.

12. The method of claim 9, wherein the determining step receives from a user an express designation of the remote receiver.

13. The method of claim 9, wherein the method comprises sending the copy of the located components toward the remote receiver in a self-installing plug-in package.

14. The method of claim 9, wherein the method comprises sending the copy of the located components toward the remote receiver in a package which contains sharing metadata, namely, historic information about the sharing of the artifact.

15. The method of claim 9, further comprising the step of maintaining an audit trail identifying at least the artifact and the remote receiver.

16. The method of claim 9, further comprising the step of receiving a share request from the remote receiver prior to sharing components of the multi-component software development artifact with the remote receiver.

17. A configured storage medium in a system configured with data and instructions to cause at least one device having a processor and a memory to perform steps comprising a method for receiving a shared multi-component development artifact, the steps comprising:

receiving in an integrated development environment a package containing at least two components of a multi-component software development artifact and an associated type description; and alerting a user to the presence of the received components, by an alert within the integrated development environment which initially presents the multi-component software development artifact to a user by displaying an artifact name without listing all received components of the artifact.

18. The configured storage medium of claim 17, wherein the system is configured to place the received components in a scratch buffer without merging the received components into the integrated development environment.

19. The configured storage medium of claim 17, wherein the system is configured to automatically determine whether a conflict between components may occur, by comparing information from the type description with information about a component that was already present in the integrated development environment before the receiving step.

20. The configured storage medium of claim 17, wherein the system is configured to receive components of different file types and also of different categories which are part of one multi-component software development artifact, the categories comprising: program code whether source or executable, natural language text, images, and sound recordings.

* * * * *